US012693524B2

(12) United States Patent　　(10) Patent No.:　US 12,693,524 B2
Nomaru　　　　　　　　　　　　(45) Date of Patent:　Jul. 28, 2026

(54) OPTICAL PART ASSEMBLY

(71) Applicant: DISCO CORPORATION, Tokyo (JP)

(72) Inventor: Keiji Nomaru, Tokyo (JP)

(73) Assignee: DISCO CORPORATION, Tokyo (JP)

( * ) Notice: Subject to any disclaimer, the term of this patent is extended or adjusted under 35 U.S.C. 154(b) by 271 days.

(21) Appl. No.: 18/543,119

(22) Filed: Dec. 18, 2023

(65) Prior Publication Data

US 2024/0219711 A1　　Jul. 4, 2024

(30) Foreign Application Priority Data

Dec. 28, 2022　(JP) ................................. 2022-211807

(51) Int. Cl.
G02B 26/08　　　(2006.01)
G02B 26/00　　　(2006.01)

(52) U.S. Cl.
CPC ....... G02B 26/0858 (2013.01); G02B 26/004 (2013.01)

(58) Field of Classification Search
CPC . G02B 26/0858; G02B 26/004; G02B 26/085
See application file for complete search history.

(56) References Cited

U.S. PATENT DOCUMENTS

| | | | | | |
|---|---|---|---|---|---|
| 4,664,487 | A | * | 5/1987 | Tam ..................... | G02B 7/1821 |
| | | | | | 359/874 |
| 5,574,322 | A | * | 11/1996 | Nii ........................ | G02B 26/121 |
| | | | | | 310/156.04 |
| 2003/0213889 | A1 | * | 11/2003 | Miura ..................... | G02B 7/00 |
| | | | | | 248/683 |
| 2020/0344417 | A1 | * | 10/2020 | Xu ........................ | G02B 27/646 |

FOREIGN PATENT DOCUMENTS

JP　　　　2005313182 A　　11/2005

* cited by examiner

*Primary Examiner* — Euncha P Cherry
(74) *Attorney, Agent, or Firm* — GREER BURNS & CRAIN, LTD.

(57)　　　　　　ABSTRACT
An optical part assembly includes a mirror main body including a base having a mirror support section that is formed integral with the base and a projected tip, a mirror mounted on the projected tip, a casing that has an opening in which to expose the mirror support section at a tip thereof, that has a rear end closed with a bottom plate, and that accommodates the mirror main body, a plurality of driving sections that are disposed on the bottom plate of the casing and act on the base to swing the base, a ring member having an opening and fixed to a front end part of the casing, a magnetic fluid that is disposed between the mirror support section and the ring member, and a plurality of springs that make contact with a front end part of the base and that elastically support the mirror main body.

6 Claims, 4 Drawing Sheets

FIG.2

OPTICAL PART ASSEMBLY

BACKGROUND OF THE INVENTION

Field of the Invention

The present invention relates to an optical part assembly which includes a mirror and in which an optical path is variable.

Description of the Related Art

A wafer having a plurality of devices such as integrated circuits (ICs) and large-scale integrations (LSIs) formed on a front surface thereof, the devices being partitioned by a plurality of intersecting streets, is divided into individual device chips by a laser processing apparatus, and the divided device chips are utilized for electric equipment such as a mobile phone and a personal computer.

The laser processing apparatus includes a chuck table that holds the wafer, a laser beam applying unit that applies a laser beam to the wafer held by the chuck table, and a processing feeding mechanism that performs processing feeding of the chuck table and the laser beam applying unit relative to each other (see, for example, Japanese Patent Laid-open No. 2005-313182).

In addition, the laser beam applying unit includes a laser oscillator that emits the laser beam, a light concentrator that concentrates the laser beam emitted by the laser oscillator on the wafer held by the chuck table, and an optical part assembly that is disposed between the laser oscillator and the light concentrator and includes a mirror for adjusting the optical path of the laser beam.

SUMMARY OF THE INVENTION

The optical part assembly including the mirror for adjusting the optical path as described above is connected with a driving section in order to adjust the optical path of the light reflected by the mirror and is configured such that the optical path can be adjusted by driving a base to which the mirror is mounted, by the driving section. The optical part assembly has a problem that, in adjusting the optical path, fine dust or the like is generated from a movable part of the driving section and is scattered to contaminate the optical path of the laser beam.

Accordingly, an object of the present invention is to provide an optical part assembly that can avoid a problem that, in adjusting the optical path of light reflected by a mirror, fine dust is generated from a movable part of a driving section and is scattered to contaminate the optical path of the laser beam.

In accordance with an aspect of the present invention, there is provided an optical part assembly comprising a mirror main body including a base and a mirror support section that is formed integral with the base and having a projected tip, a mirror mounted on the projected tip of the mirror support section, a casing that has an opening in which to expose the mirror support section at a tip thereof, that has a rear end closed with a bottom plate, and that accommodates the mirror main body; a plurality of driving sections that are disposed on the bottom plate of the casing and act on the base to swing the base, a ring member having an opening and fixed to a front end part of the casing, a holding member fixed to an inner circumference of the casing, a plurality of elastic members disposed between the base of the mirror main body and the holding member, and a magnetic fluid that is disposed between the mirror support section of the mirror main body and the ring member to fill the opening of the ring member.

Preferably, each of the driving sections includes a piezo-actuator, and a pin which is coupled with the piezo-actuator and a tip of which makes contact with the driving section. Alternatively, each of the driving sections is mounted outside the bottom plate, and a coupling member inserted in a through hole formed in the bottom plate couples the driving section with the base.

According to the optical part assembly of the present invention, in changing the optical path, the angle of the mirror of each optical part assembly can be changed into a desired angle, and, even if fine dust is generated from the driving sections for swinging the base, the problem that the dust is scattered into the region of the optical path of the light to contaminate the optical path is dissolved.

The above and other objects, features and advantages of the present invention and the manner of realizing them will become more apparent, and the invention itself will best be understood from a study of the following description and appended claims with reference to the attached drawings showing some preferred embodiments of the invention.

BRIEF DESCRIPTION OF THE DRAWINGS

FIG. 2 is a block diagram depicting an outline of a laser beam applying unit mounted to the laser applying apparatus depicted in FIG. 1;

DETAILED DESCRIPTION OF THE PREFERRED EMBODIMENTS

Figure 1:
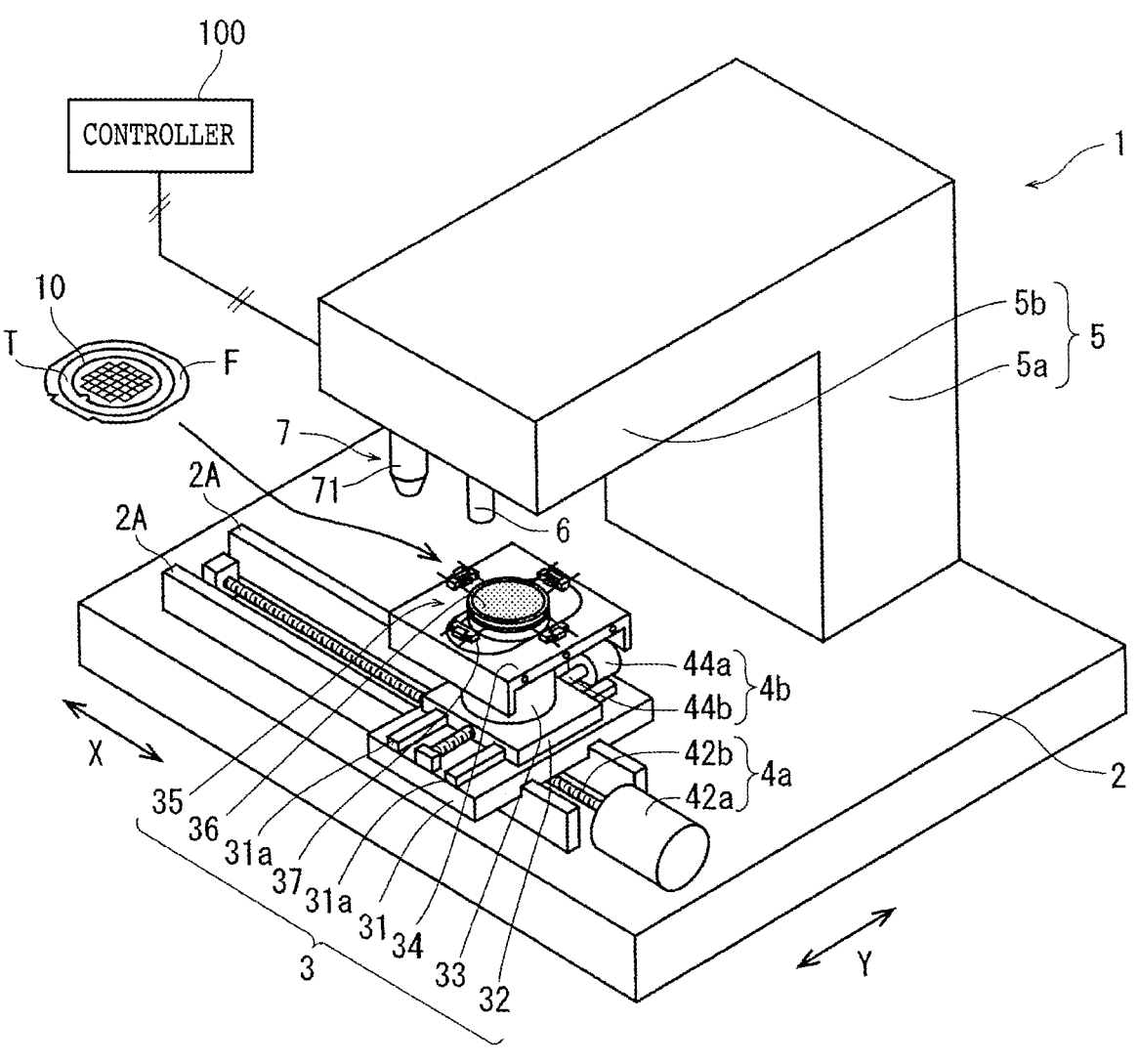
FIG. 1 is an overall perspective view of a laser applying apparatus according to an embodiment of the present invention.

A laser applying apparatus to which an optical part assembly according to an embodiment of the present invention is mounted will be described in detail below with reference to the attached drawings. FIG. 1 illustrates the laser applying apparatus 1 according to the present embodiment. The laser applying apparatus 1 is an apparatus that includes a laser beam applying unit 7 applying a laser beam to a wafer 10 disposed on a base 2, and that applies laser processing to the wafer 10 held by an annular frame F through a protective tape T as illustrated in FIG. 1 (see also FIG. 2).

The laser applying apparatus 1 includes, in addition to the laser beam applying unit 7 described above, a holding unit 3 that holds the wafer 10, an aligning unit 6 that images the wafer 10 held by the holding unit 3 and that carries out an aligning step, an X-axis moving mechanism 4a that moves the holding unit 3 in an X-axis direction, a Y-axis moving mechanism 4b that moves the holding unit 3 in a Y-axis direction, a frame body 5 including a vertical wall section 5a that is erected on the base 2 on a lateral side of the X-axis moving mechanism 4a and the Y-axis moving mechanism 4b and a horizontal wall section 5b that extends in a horizontal direction from an upper end of the vertical wall section 5a, and a controller 100 that controls each of operating sections.

The holding unit 3 is means for holding the wafer 10, with an XY plane specified by X coordinates and Y coordinates as a holding surface, and as depicted in FIG. 1, the holding unit 3 includes a rectangular X-axis direction movable plate 31 mounted on the base 2 so as to be movable in the X-axis direction, a rectangular Y-axis direction movable plate 32 mounted on the X-axis direction movable plate 31 so as to be movable in the Y-axis direction, a cylindrical support column 33 fixed to an upper surface of the Y-axis direction movable plate 32, and a rectangular cover plate 34 fixed to an upper end of the support column 33. On the cover plate 34, a chuck table 35 extending upward through a slot formed on the cover plate 34 is disposed. The chuck table 35 is configured to be rotatable by an unillustrated rotational drive mechanism accommodated in the support column 33. On an upper surface of the chuck table 35, a circular suction chuck 36 that is formed from a porous material having a gas permeability property and that has an XY plane specified by X coordinates and Y coordinates as a holding surface is disposed. The suction chuck 36 is connected to unillustrated suction means through a channel passing through the support column 33, and, in the periphery of the suction chuck 36, four clamps 37 for grasping the annular frame F when holding the wafer 10 on the chuck table 35 are arranged at regular intervals.

The X-axis moving mechanism 4a converts a rotational motion of a motor 42a into a rectilinear motion through a ball screw 42b and transmits the rectilinear motion to the X-axis direction movable plate 31 to thereby move the X-axis direction movable plate 31 in the X-axis direction along a pair of guide rails 2A disposed on the base 2 along the X-axis direction. The Y-axis moving mechanism 4b converts a rotational motion of a motor 44a into a rectilinear motion through a ball screw 44b and transmits the rectilinear motion to the Y-axis direction movable plate 32 to thereby move the Y-axis direction movable plate 32 in the Y-axis direction along a pair of guide rails 31a disposed on the X-axis direction movable plate 31 along the Y-axis direction.

Inside the horizontal wall section 5b of the frame body 5, an optical system constituting the laser beam applying unit 7 and the aligning unit 6 are accommodated. On the lower side of a tip of the horizontal wall section 5b, there is disposed a light concentrator 71 that constitutes a part of the laser beam applying unit 7 and that applies the laser beam to the wafer 10. The aligning unit 6 is imaging means for imaging the wafer 10 held by the holding unit 3 and detecting a laser processing position to which the laser beam is to be applied, and the like, and is disposed at a position adjacent to the light concentrator 71 described above in the X-axis direction indicated by an arrow X in the figure.

Figure 2:
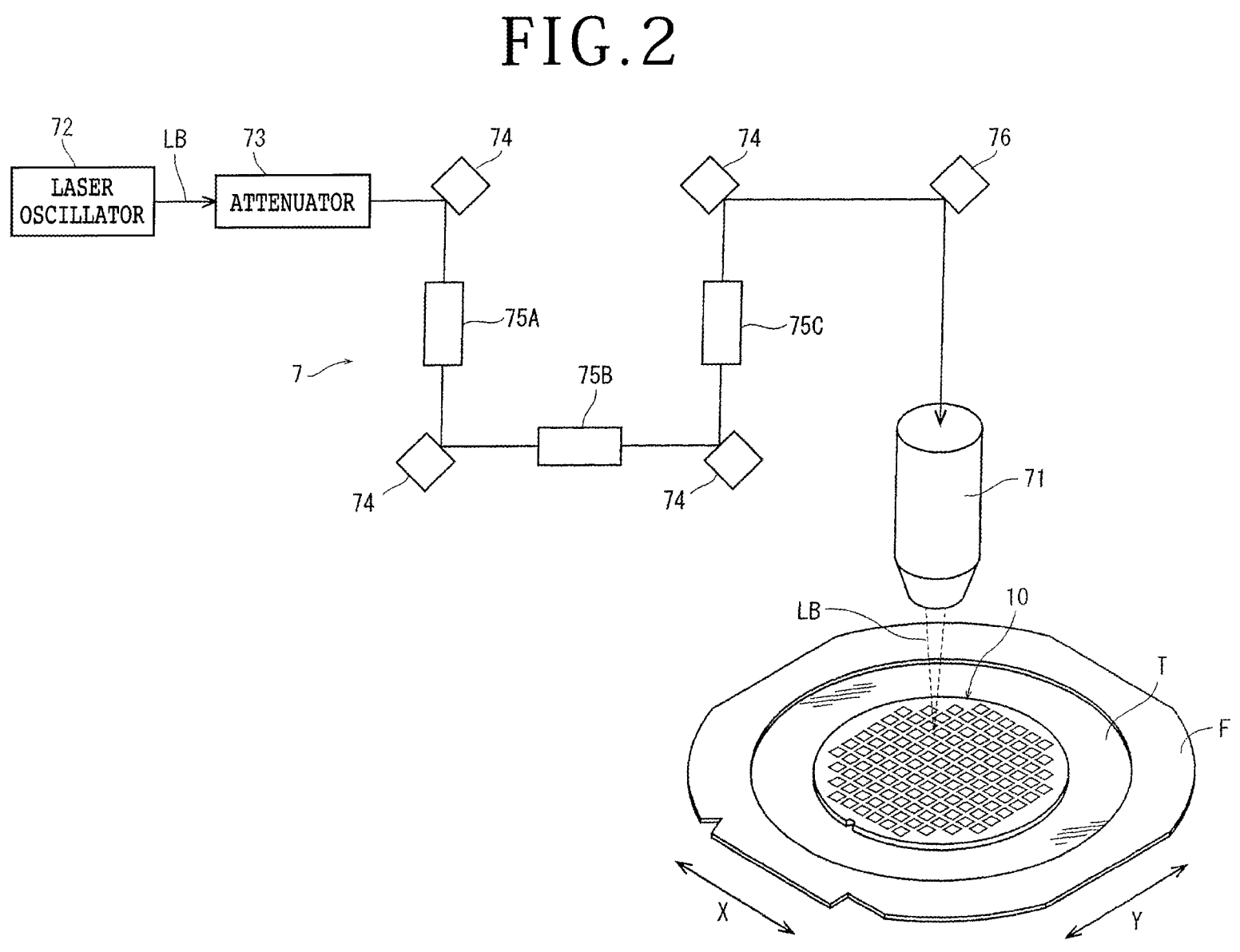

FIG. 2 depicts a block diagram illustrating an outline of the laser beam applying unit 7 described above. The laser beam applying unit 7 includes, as needed, a laser oscillator 72 that emits a laser beam LB, an attenuator 73 that adjusts output of the laser beam LB emitted by the laser oscillator 72, the light concentrator 71 that concentrates the laser beam LB on the wafer 10 held by the chuck table 35 described above, a plurality of (in the present embodiment, four) variable mirror assemblies 74 that are optical part assemblies which are disposed between the laser oscillator 72 and the light concentrator 71 and in which an optical path of the light reflected is variable, and a fixed mirror 76 that modifies the optical path direction into a predetermined direction.

Further, in the embodiment described above, optical systems 75A to 75C freely disposed according to a mode of the laser processing are included between one variable mirror assembly 74 and another variable mirror assembly 74. Examples of the optical systems 75A to 75C include an assembled lens in which a plurality of lenses are combined with one another, a polarizing plate such as a ½ wavelength plate, and spot forming means for shaping the spot shape by a slit. The plurality of variable mirror assemblies 74 in the present embodiment are provided for adjusting the optical path of the laser beam LB going forward through the optical system of the laser beam applying unit 7, and more specifically, the angle of each of the variable mirror assemblies 74 is adjusted so as to adjust the optical path which may be deviated while the laser beam LB passes through the optical systems 75A to 75C described above, and the focal point of the laser beam LB is accurately positioned at a position at which the wafer 10 is to be processed.

The variable mirror assembly 74 which is the optical part assembly configured on the basis of the present invention will be described further specifically below, with reference to FIGS. 3 and 4. An exploded perspective view of the variable mirror assembly 74 is depicted on the upper side in FIG. 3, and a perspective view of the variable mirror assembly 74 in the state of being integrated by combining the configurations with one another is depicted on the lower side in FIG. 3.

Figure 3:
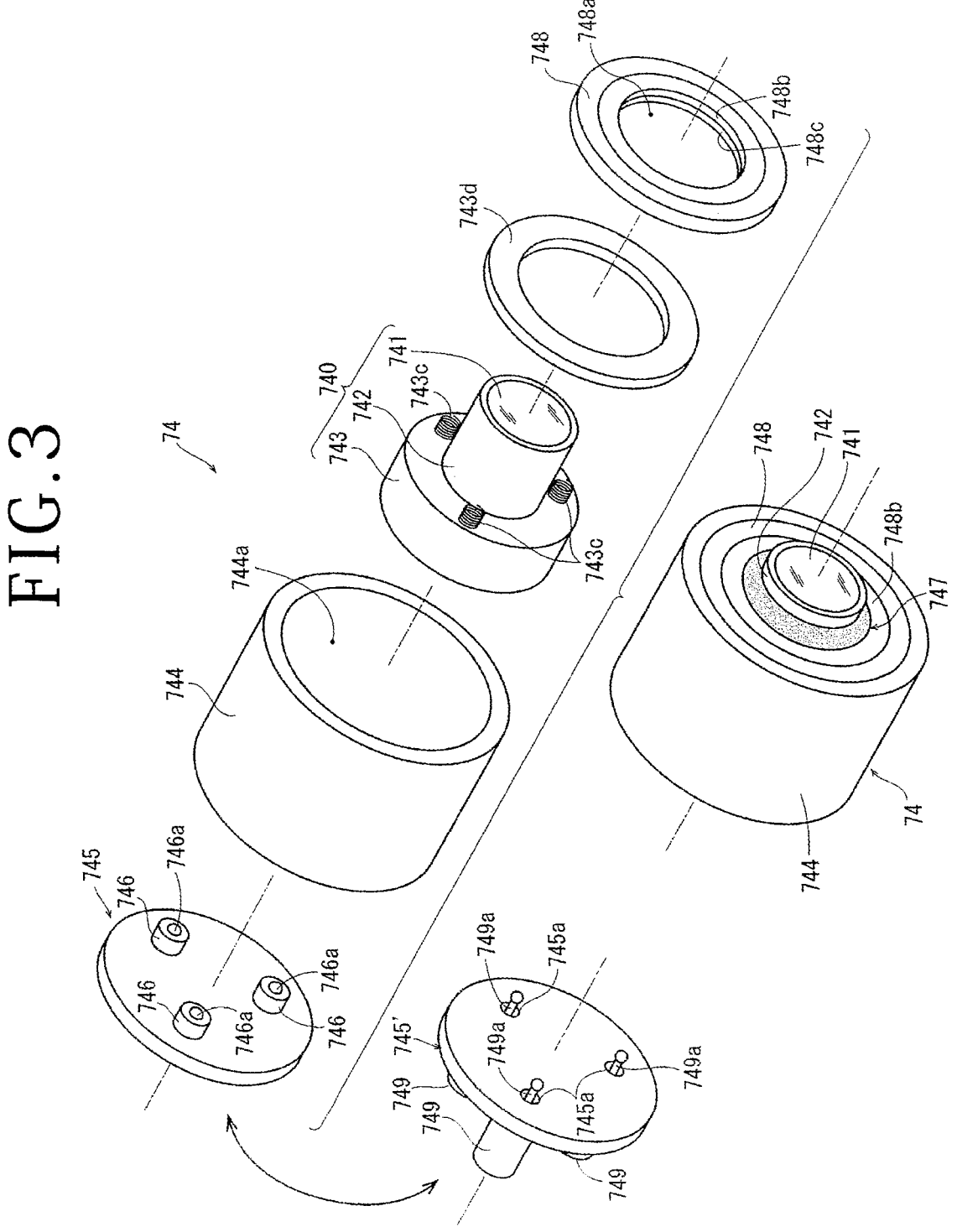
FIG. 3 is an exploded perspective view of an optical part assembly included in the laser beam applying unit depicted in FIG. 2, and a perspective view of the optical part assembly in an integrated state.
Figure 4A:
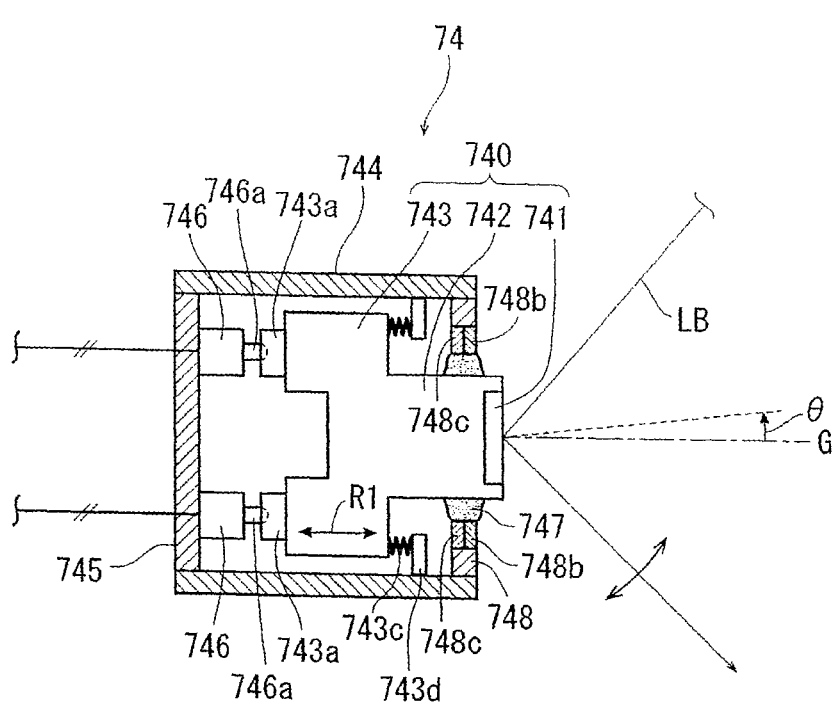
FIG. 4A is a schematic sectional view of the optical part assembly depicted in FIG. 3.

The variable mirror assembly 74 illustrated in FIGS. 3 and 4A includes a mirror main body 740 including a mirror support section 742 that supports a mirror 741 on a projected one end thereof and a base 743 formed on the side opposite to the mirror support section 742, a casing 744 that has an opening 744a in which to expose the mirror support section 742 and accommodates the mirror main body 740, and driving sections 746 that are disposed on a bottom plate 745 closing the opposite side of the opening 744a of the casing 744 and that swing the base 743, and a magnetic fluid 747 that fills the gap between the opening 744a of the casing 744 and the mirror main body 740 is disposed in the gap. Springs 743c for elastically supporting the mirror main body 740 are disposed on the front surface side (the mirror 741 side) of the base 743, and a holding ring 743d that makes contact with the springs 743c is disposed inside the casing 744. The magnetic fluid 747 is, for example, a dispersion of ferromagnetic particulates in a solvent such as a hydrocarbon-based solvent and is a colloidal solution having viscosity. The function and action of the magnetic fluid 747 will be described later.

At the time of assembling the variable mirror assembly 74, as depicted in FIG. 3, the mirror main body 740 is accommodated in the casing 744, the holding ring 743d described above is inserted into the casing 744 in which the mirror main body 740 is accommodated, the holding ring 743d is fixed at a position of making contact with the springs 743c, and a ring member 748 is mounted to the opening 744a of the casing 744 to obtain an integral body. Next, the magnetic fluid 747 is injected into the gap between the mirror support section 742 and an opening 748a of the ring member 748 to fill the gap, and the casing 744 is thereby closed. The opening 748a side of the ring member 748 is configured by a first ring 748b (S pole) and a second ring 748c (N pole) functioning as magnetic poles by a permanent magnet, and a magnetic circuit is formed by the first ring 748b (S pole) and the second ring 748c (N pole) thus configured and the magnetic fluid 747, so that the magnetic fluid 747 is stably held between the mirror support section 742 and the ring member 748.

As understood from FIG. 3 and FIG. 4A which depicts, partly in section, the inside configuration of the variable mirror assembly 74 depicted in FIG. 3, the mirror main body 740 of the variable mirror assembly 74 of the present embodiment has a configuration in which a driven sections 743a disposed on the rear surface side (the side opposite to the mirror 741) of the base 743 make contact with respective driving pins 746a of the three driving sections 746 described above, and the front surface side of the base 743 is supported by the springs 743c and the holding ring 743d for elastically supporting the mirror main body 740.

The driving section 746 described above includes, for example, a piezo-actuator. By adjusting a voltage exerted on the piezo-actuator constituting each of the driving sections 746, the projecting amounts of the driving pins 746a of the driving sections 746 making contact with the driven sections 743a can be adjusted, whereby, for example, the base 743 can be swung in a direction of an arrow R1 indicated in FIG. 4A, and an orientation of the mirror 741 supported by the mirror support section 742, more specifically, an optical axis G of the mirror 741, can be adjusted into a desired direction at an angle θ. In this instance, the magnetic fluid 747 having viscosity follows the variation in the form of the gap, so that the orientation of the mirror 741 is adjusted, while maintaining the state in which the gap is closed. As a result, at the time of laser processing of the wafer 10 held by the chuck table 35, the orientation of the surface of the mirror 741 of each variable mirror assembly 74 can be adjusted into a desired direction and at a desired angle, whereby the optical path of the laser beam LB emitted by the laser oscillator 72 described above can be adjusted.

Figure 4B:
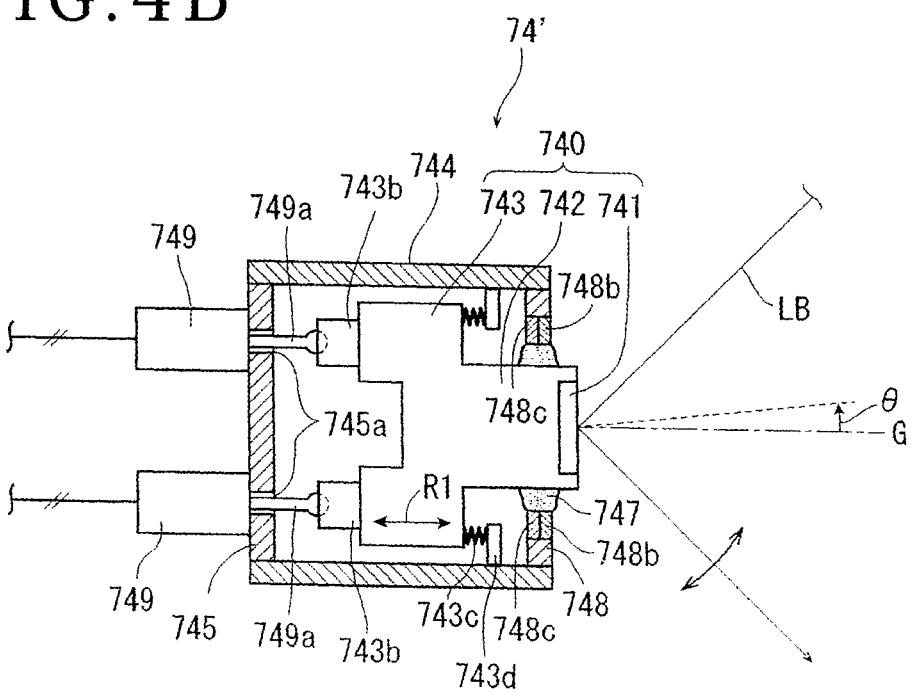
FIG. 4B is a schematic sectional view depicting another embodiment of the optical part assembly.

In addition, the present invention is not limited to the configuration of the variable mirror assembly 74 described above and may be configured, for example, as a variable mirror assembly 74' depicted in FIG. 4B. As depicted on the left lower side in FIG. 3, the variable mirror assembly 74' includes a bottom plate 745' on which driving sections 749 are disposed in place of the driving sections 746 on the bottom plate 745 of the variable mirror assembly 74 described above. The driving section 749 includes an unillustrated pulse motor and a coupling section 749a which is advanced and retracted by rotation of the pulse motor. The driving sections 749 are disposed in three at regular intervals of 120° as viewed from the center of the bottom plate 745', pass through three respective through holes 745a formed in the bottom plate 745', and are coupled with the driven sections 743b disposed at positions corresponding to the respective driving sections 749, as depicted in FIG. 4B.

The projecting amount of each coupling section 749a is adjusted by forward or reverse rotation of the pulse motor constituting each driving section 749, whereby, for example, the base 743 can be swung in the direction of the arrow R1, and the optical axis G of the mirror 741 can be adjusted into a desired direction at an angle θ. At the time of laser processing of the wafer 10 held by the chuck table 35 described above, each driving section 749 of the variable mirror assembly 74' is operated, whereby the orientation of the surface of the mirror 741 can be adjusted, and the optical path of the laser beam LB emitted from the laser oscillator 72 can be adjusted. In the variable mirror assembly 74', the magnetic fluid 747 makes contact with the first ring 748b (S pole) and the second ring 748c (N pole) and makes contact with the mirror support section 742 constituting the mirror main body 740, to fill the gap between the opening 748a and the mirror main body 740, and is flexibly deformed between the mirror support section 742 and the ring member 748 and is stably held in situ.

As above described, the variable mirror assembly 74 in the present embodiment includes the driving sections 746 that are disposed on the bottom plate 745 of the casing 744 and that swing the base 743 of the mirror main body 740, and includes the magnetic fluid 747 that fills the gap between the opening 744a of the casing 744 and the mirror main body 740. As a result, even if fine dust is generated attributable to an operation of the driving sections 746 for swinging the base 743, the problem that the dust is scattered into the region of the optical path in which the laser beam LB advances and is contaminate the optical path is dissolved.

Note that the position at which to dispose the variable mirror assembly 74 or 74' configured on the basis of the present invention is not limited to that in the above-described embodiments, and any location where the optical path of the light applied should be variable can be adopted.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. An optical part assembly comprising:
a mirror main body including a base and a cylindrical mirror support section that is formed integral with the base and having a projected tip;
a mirror mounted on the projected tip of the cylindrical mirror support section;
a casing that has an opening in which to expose the cylindrical mirror support section at a tip thereof, that has a rear end closed with a bottom plate, and that accommodates the mirror main body;
a plurality of driving sections that are disposed on the bottom plate of the casing and act on the base to swing the base;
a ring member having an opening and fixed to a front end part of the casing;
a holding member fixed to an inner circumference of the casing;
a plurality of elastic members disposed between the base of the mirror main body and the holding member; and
a magnetic fluid that is disposed between an outer peripheral surface of the cylindrical mirror support section of the mirror main body and the ring member to fill the opening of the ring member.

2. The optical part assembly according to claim 1, wherein each of the driving sections includes a piezo-actuator and a pin which is coupled with the piezo-actuator and a tip of which makes contact with the base.

3. An optical part assembly comprising:
a mirror main body including a base and a mirror support section that is formed integral with the base and having a projected tip;
a mirror mounted on the projected tip of the mirror support section;
a casing that has an opening in which to expose the mirror support section at a tip thereof, that has a rear end closed with a bottom plate, and that accommodates the mirror main body;
a plurality of driving sections that are disposed on the bottom plate of the casing and act on the base to swing the base;
a ring member having an opening and fixed to a front end part of the casing;
a holding member fixed to an inner circumference of the casing;
a plurality of elastic members disposed between the base of the mirror main body and the holding member;

a magnetic fluid that is disposed between the mirror support section of the mirror main body and the ring member to fill the opening of the ring member;

a first ring magnetized in N pole and disposed at the opening of the ring member; and a second ring magnetized in S pole and disposed at the opening of the ring member, wherein the magnetic fluid is disposed between the first and second rings and the mirror support section.

4. The optical part assembly according to claim 1, wherein each of the driving sections is mounted outside the bottom plate, and a coupling member inserted in a through hole formed in the bottom plate and couples the driving section with the base.

5. The optical part assembly according to claim 1, wherein the mirror is fixed to the cylindrical mirror support section such that the mirror, the cylindrical mirror support section of the mirror main body, and the base of the mirror main body all move together when acted upon by the plurality of driving sections.

6. The optical part assembly according to claim 1, wherein the base of the mirror main body is of a larger outer diameter than that of the cylindrical mirror support section of the mirror main body.

* * * * *